United States Patent
Maes

(10) Patent No.: US 10,263,807 B2
(45) Date of Patent: Apr. 16, 2019

(54) HIERARCHICAL STATISTICS ACCELERATION

(71) Applicant: Ciena Corporation, Hanover, MD (US)

(72) Inventor: Richard Donald Maes, Liberty Lake, WA (US)

(73) Assignee: Ciena Corporation, Hanover, MD (US)

( * ) Notice: Subject to any disclaimer, the term of this patent is extended or adjusted under 35 U.S.C. 154(b) by 214 days.

(21) Appl. No.: 15/423,353

(22) Filed: Feb. 2, 2017

(65) Prior Publication Data

US 2018/0176114 A1 Jun. 21, 2018

Related U.S. Application Data

(60) Provisional application No. 62/435,882, filed on Dec. 19, 2016.

(51) Int. Cl.
| | |
|---|---|
| *H04L 12/00* | (2006.01) |
| *H04L 12/46* | (2006.01) |
| *H04L 12/26* | (2006.01) |
| *H04L 12/24* | (2006.01) |
| *H04L 12/823* | (2013.01) |

(52) U.S. Cl.
CPC ........ *H04L 12/4633* (2013.01); *H04L 41/142* (2013.01); *H04L 43/022* (2013.01); *H04L 43/04* (2013.01); *H04L 43/14* (2013.01); *H04L 47/32* (2013.01); *H04L 2212/00* (2013.01)

(58) Field of Classification Search
CPC .... H04L 12/4641; H04L 43/14; H04L 43/022
USPC .................................................. 709/223, 224
See application file for complete search history.

(56) References Cited

U.S. PATENT DOCUMENTS

| | | | | |
|---|---|---|---|---|
| 5,606,600 A * | 2/1997 | Elliott | ..................... | H04M 3/36 379/112.01 |
| 5,768,352 A * | 6/1998 | Elliott | ..................... | H04M 3/36 379/112.01 |
| 5,793,767 A * | 8/1998 | Soda | ................... | H04Q 11/0478 370/397 |
| 6,321,338 B1 * | 11/2001 | Porras | ................... | H04L 41/142 709/224 |

(Continued)

*Primary Examiner* — Frantz Coby
(74) *Attorney, Agent, or Firm* — Clements Bernard Walker PLLC; Christopher L. Bernard; Lawrence A. Baratta, Jr.

(57) ABSTRACT

A method for operating a network includes receiving, by a statistics engine of a network device, a channel identifier in connection with a statistic of an input frame. The channel identifier identifies a channel of a virtual network structure, and the input frame is received by the network device via the channel of the virtual network structure. The method further includes traversing, by a statistics engine and in response to the receiving the channel identifier in connection with the statistic, a hierarchical data structure based on the channel identifier. The hierarchical data structure comprises hierarchical statistic attributes of the virtual network structure. The method further includes selecting, by the statistics engine based on the traversing and from the hierarchical statistic attributes, linked statistic attributes that are linked to the channel identifier in the hierarchical data structure, incrementing, by the statistics engine based on the statistic, an existing value of each of the linked statistic attributes to generate an incremented value, and presenting, subsequent to the incrementing the existing value, the hierarchical statistic attributes.

20 Claims, 9 Drawing Sheets

(56) References Cited

U.S. PATENT DOCUMENTS

| | | | | |
|---|---|---|---|---|
| 6,366,563 | B1* | 4/2002 | Weldon | H04L 12/4641 370/252 |
| 7,187,683 | B1* | 3/2007 | Sandoval | H04L 41/142 370/410 |
| 7,522,604 | B2* | 4/2009 | Hussain | H04L 45/00 370/389 |
| 8,407,166 | B2* | 3/2013 | Hawkins | G06N 3/049 706/13 |
| 8,595,837 | B2* | 11/2013 | Antony | G06F 21/577 715/736 |
| 9,176,948 | B2* | 11/2015 | Sorensen | G06F 17/276 |
| 9,219,650 | B2* | 12/2015 | Sakata | H04L 41/00 |
| 2008/0201054 | A1* | 8/2008 | Grichnik | B60W 40/00 701/102 |
| 2009/0076774 | A1* | 3/2009 | Miyajima | G08G 1/0104 702/179 |
| 2010/0050025 | A1* | 2/2010 | Grichnik | G05B 17/02 714/47.2 |
| 2012/0074238 | A1* | 3/2012 | Morita | F02D 13/0249 237/5 |
| 2013/0242983 | A1* | 9/2013 | Tripathi | H04L 49/25 370/355 |
| 2013/0329584 | A1* | 12/2013 | Ghose | H04L 45/586 370/252 |
| 2015/0244617 | A1* | 8/2015 | Nakil | G06F 9/45558 709/224 |
| 2016/0261702 | A1* | 9/2016 | Zhang | G06Q 10/10 |
| 2017/0011083 | A1* | 1/2017 | Kosuru | G06F 17/30327 |
| 2018/0131586 | A1* | 5/2018 | Ciodaru | H04L 43/062 |

* cited by examiner

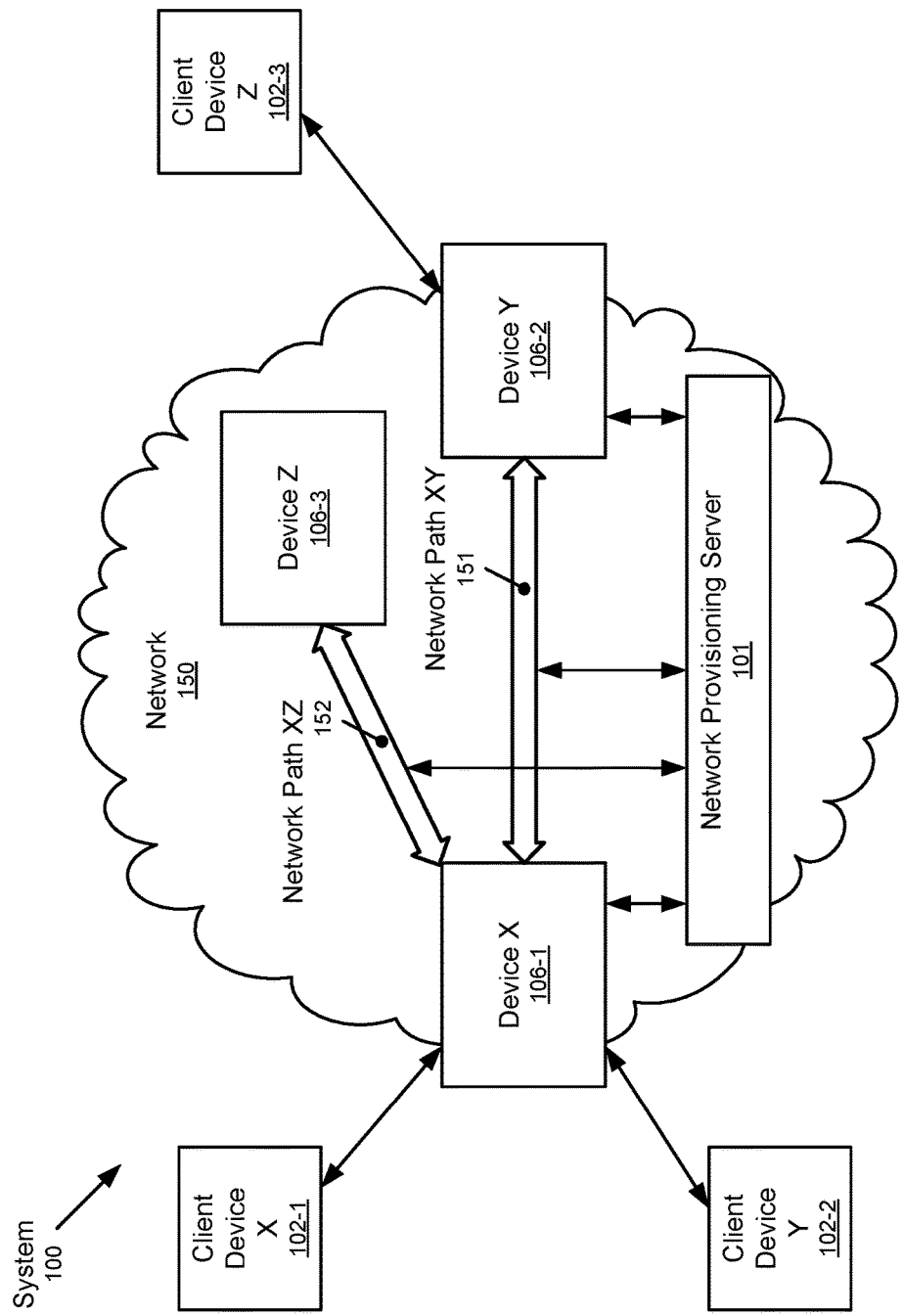
FIG. 1.1

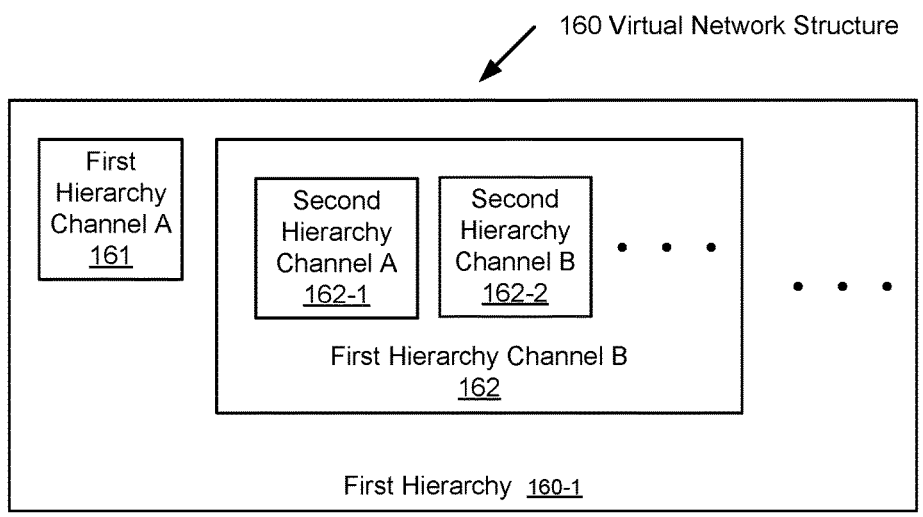
FIG. 1.2
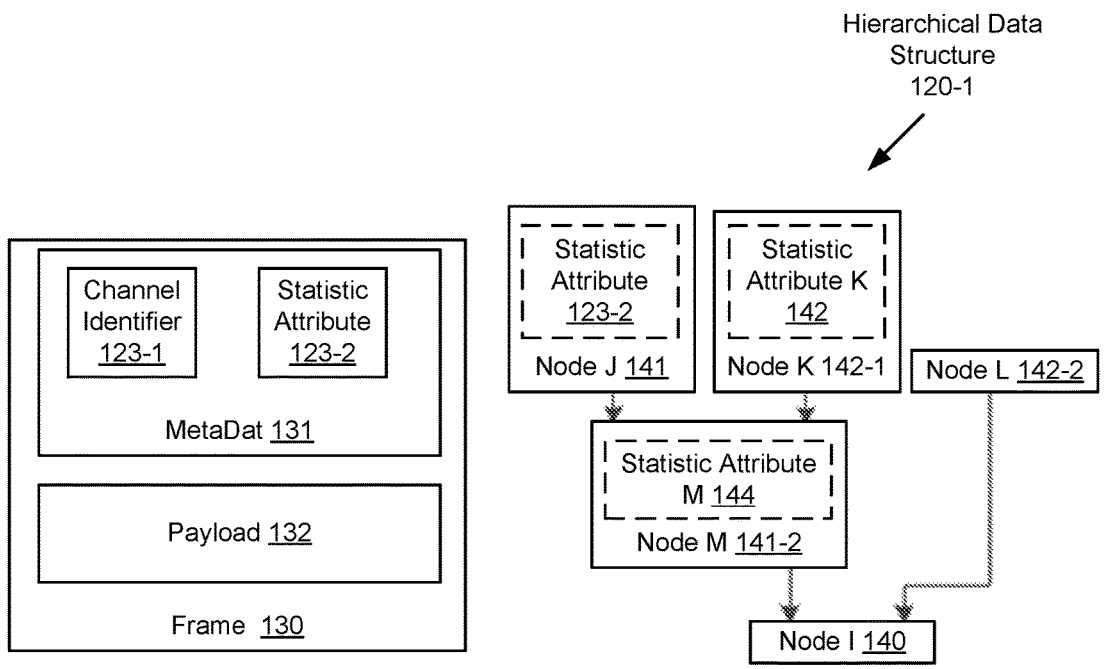
FIG. 1.3
FIG. 1.5

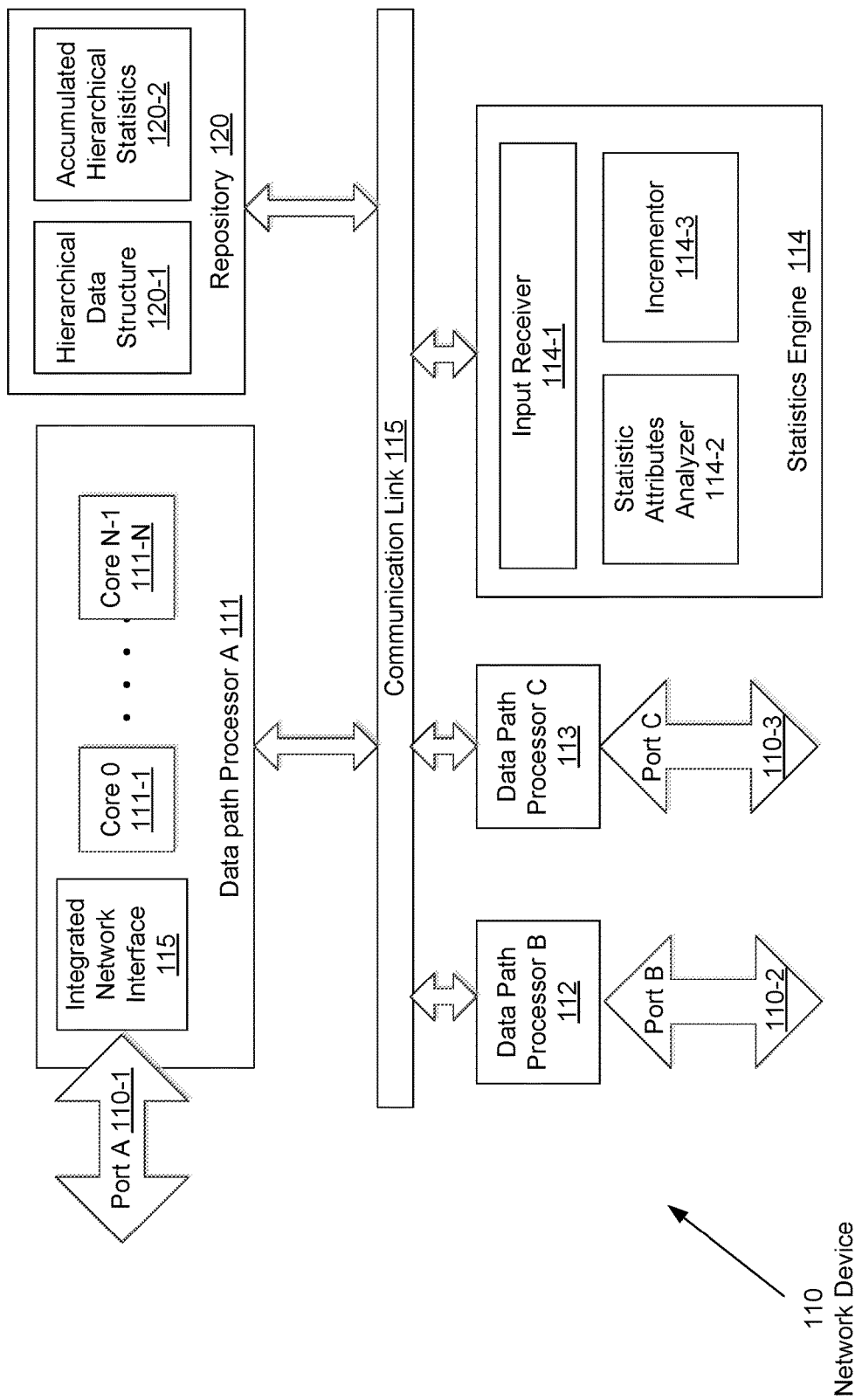
FIG. 1.4

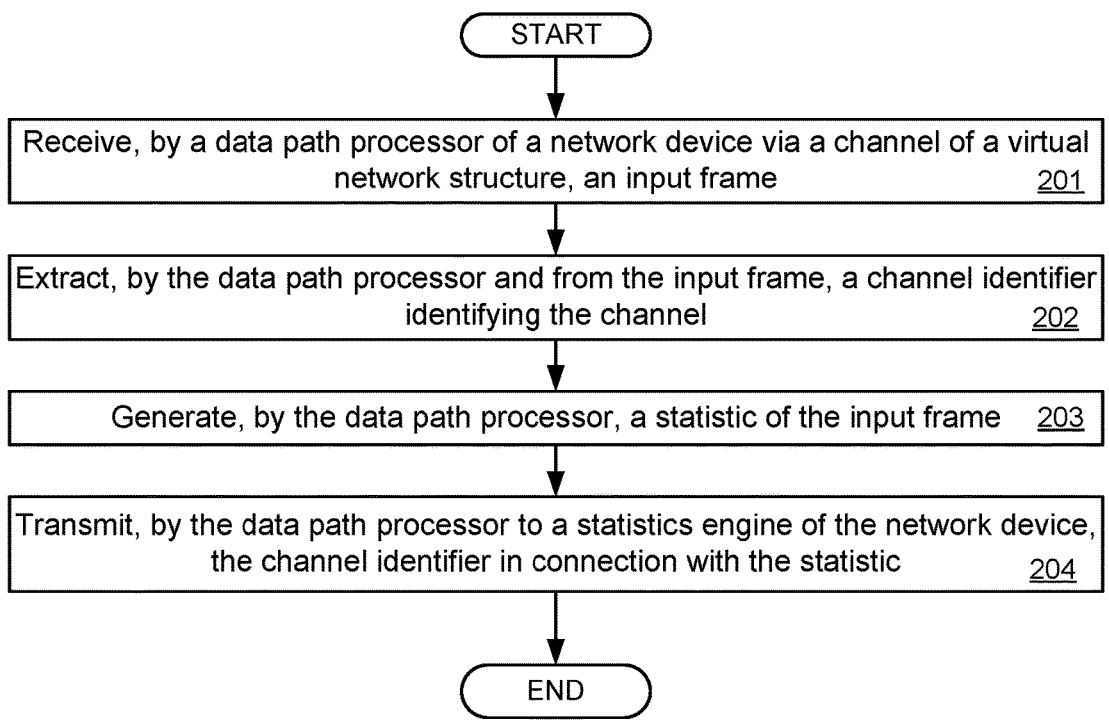
FIG. 2.1

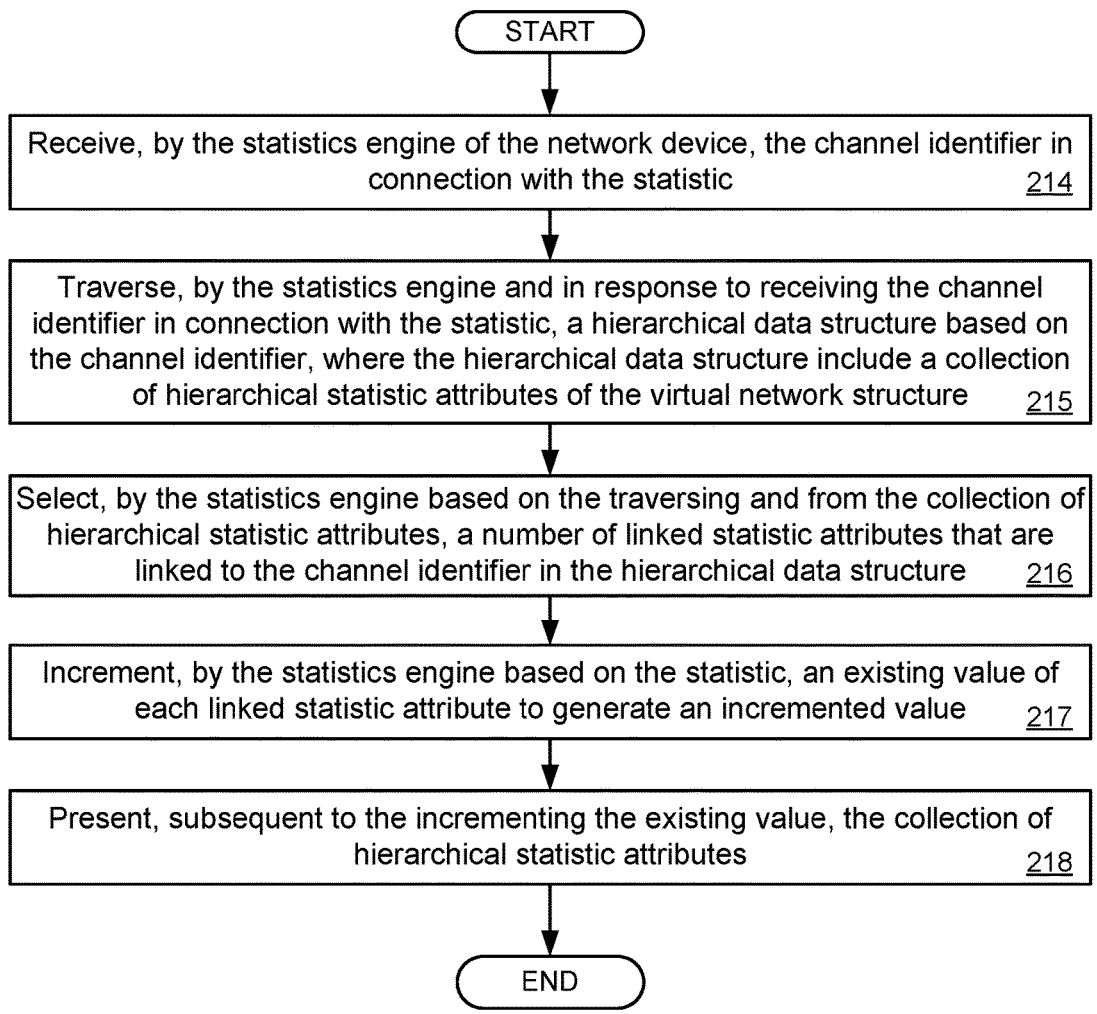
FIG. 2.2

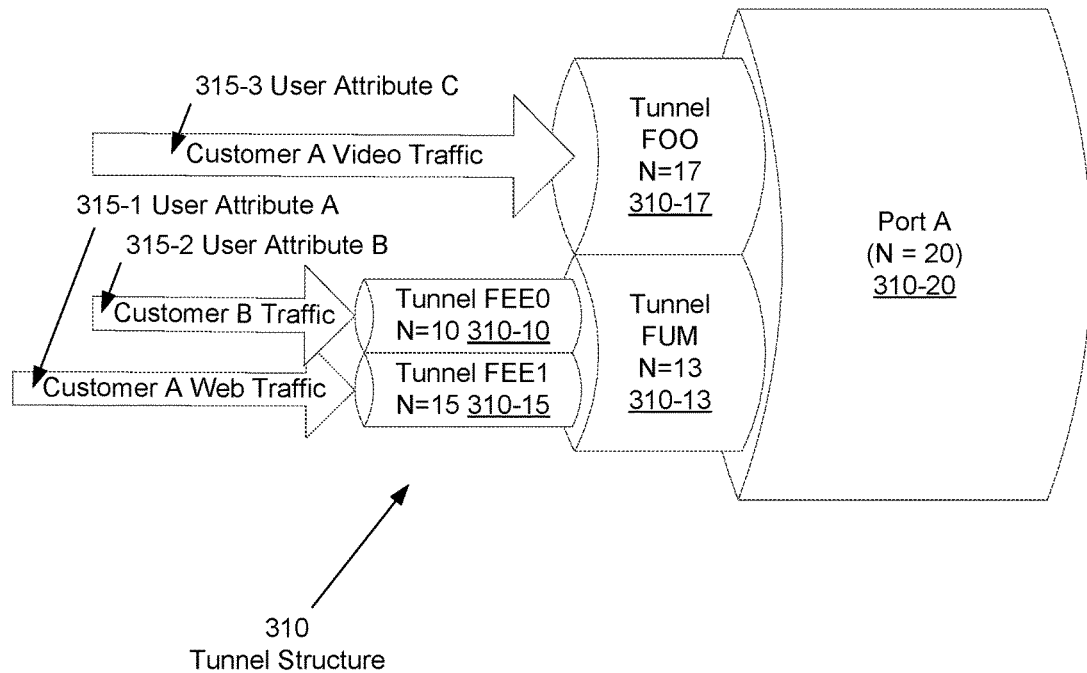
*FIG. 3.1*
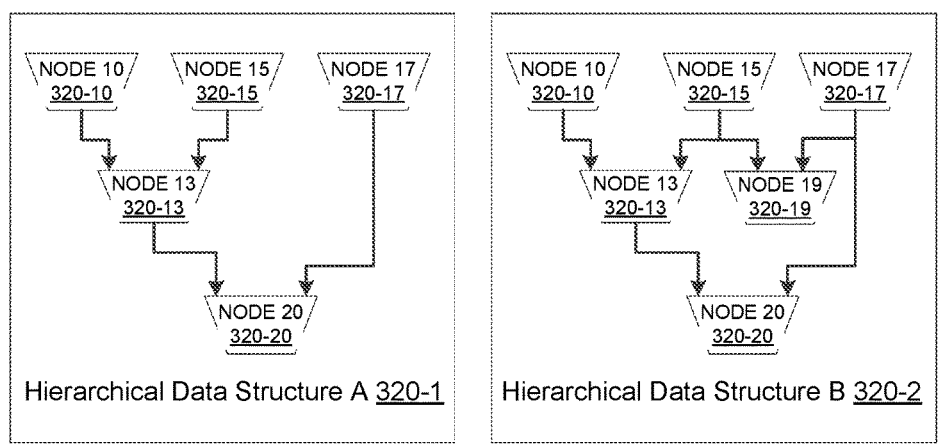
*FIG. 3.2*

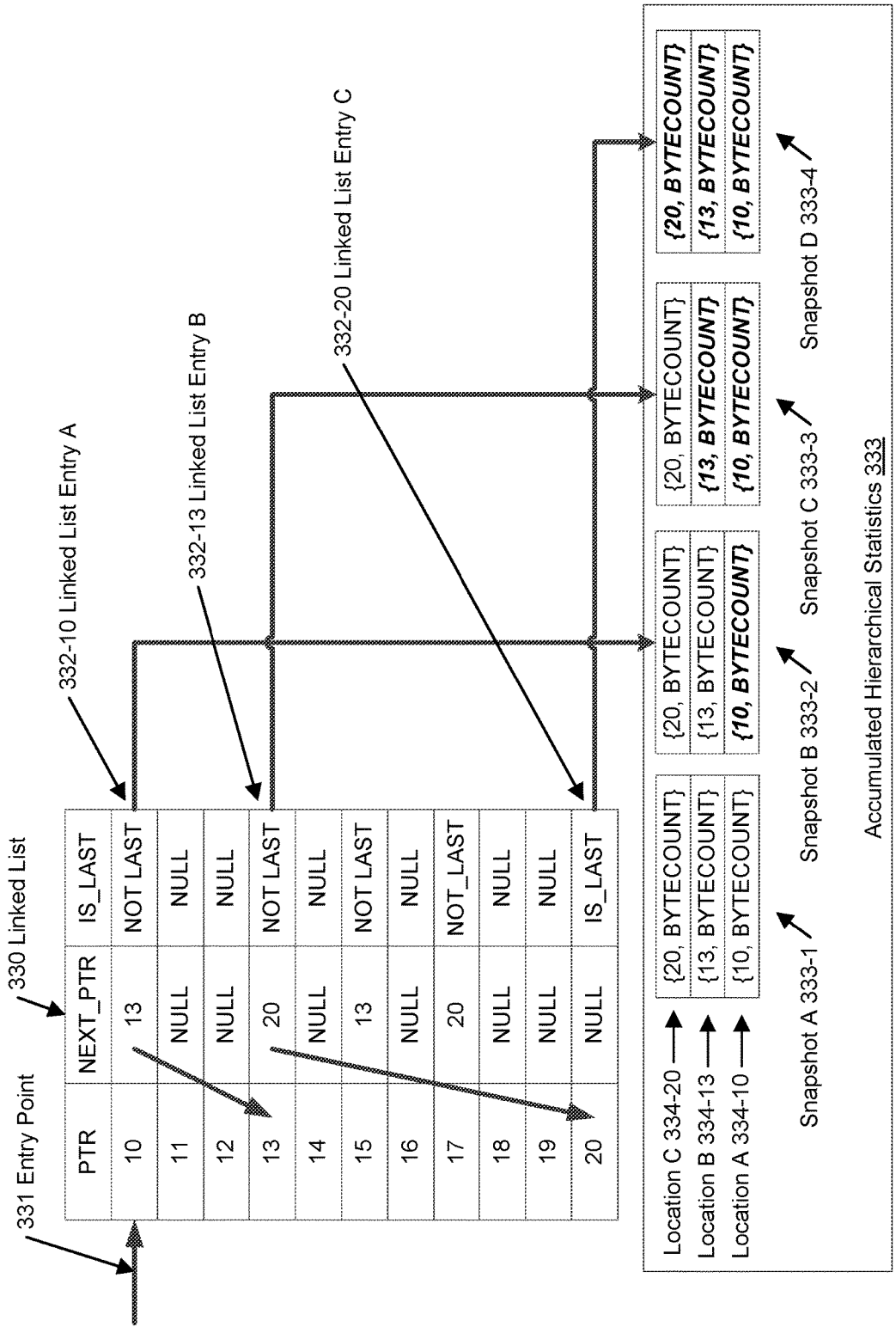
FIG. 3.3

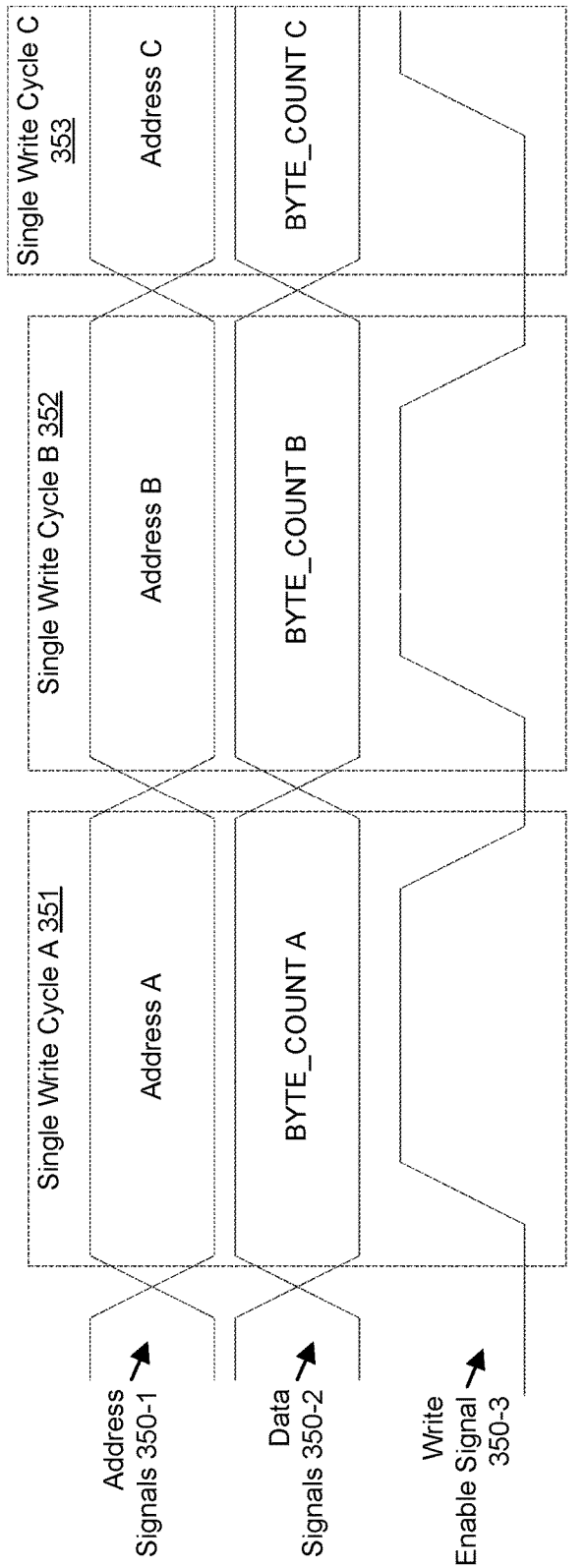

HIERARCHICAL STATISTICS ACCELERATION

CROSS-REFERENCE TO RELATED APPLICATIONS

This application claims benefit under 35 U.S.C. § 119(e) of U.S. Provisional Patent Application No. 62/435,882, filed on Dec. 19, 2016, and entitled "HIERARCHICAL STATISTICS ACCELERATION," which is hereby incorporated by reference.

BACKGROUND

A statistic is a numerical data item computed from a sample. In particular, the statistic represents a numerical fact about the sample. For example, the numerical data item may correspond to the number of times a particular event is detected in the sample. For example, statistics about network traffic (i.e., sample) are computed for customer billing, bandwidth allocation, and other network management purposes.

SUMMARY

In general, in one aspect, the invention relates to a method for operating a network. The method includes receiving, by a statistics engine of a network device, a channel identifier in connection with a statistic of an input frame. The channel identifier identifies a channel of a virtual network structure, and the input frame is received by the network device via the channel of the virtual network structure. The method further includes traversing, by a statistics engine and in response to the receiving the channel identifier in connection with the statistic, a hierarchical data structure based on the channel identifier. The hierarchical data structure comprises hierarchical statistic attributes of the virtual network structure. The method further includes selecting, by the statistics engine based on the traversing and from the hierarchical statistic attributes, linked statistic attributes that are linked to the channel identifier in the hierarchical data structure, incrementing, by the statistics engine based on the statistic, an existing value of each of the linked statistic attributes to generate an incremented value, and presenting, subsequent to the incrementing the existing value, the hierarchical statistic attributes.

In general, in one aspect, the invention relates to a network device of a network. The network device includes a statistics engine configured to receive a channel identifier in connection with a statistic of an input frame. The channel identifier identifies a channel of a virtual network structure. The input frame is received by the network device via the channel of the virtual network structure. The statistics engine is further configured to traverse, in response to the receiving the channel identifier in connection with the statistic, a hierarchical data structure based on the channel identifier, the hierarchical data structure comprising hierarchical statistic attributes of the virtual network structure. The statistics engine is further configured to select, based on the traversing and from the hierarchical statistic attributes, linked statistic attributes that are linked to the channel identifier in the hierarchical data structure, increment, based on the statistic, an existing value of each of the plurality of linked statistic attributes to generate an incremented value, and present, subsequent to the incrementing the existing value, the hierarchical statistic attributes. The network device further includes a repository storing the hierarchical data structure.

In general, in one aspect, the invention relates to a statistics engine circuitry for a network device. The statistics engine circuitry includes an input receiver configured to receive a channel identifier in connection with a statistic of an input frame. The channel identifier identifies a channel of a virtual network structure. The input frame is received by the network device via the channel of the virtual network structure. The statistics engine circuitry further includes a statistic attributes analyzer configured to traverse, in response to the receiving the channel identifier in connection with the statistic, a hierarchical data structure based on the channel identifier. The hierarchical data structure comprises hierarchical statistic attributes of the virtual network structure. The statistic attributes analyzer configured to select, based on the traversing and from the hierarchical statistic attributes, linked statistic attributes that are linked to the channel identifier in the hierarchical data structure. The statistics engine circuitry further includes an incrementor configured to increment, based on the statistic, an existing value of each of the linked statistic attributes to generate an incremented value, and present, subsequent to the incrementing the existing value, the hierarchical statistic attributes.

Other aspects of the invention will be apparent from the following description and the appended claims.

BRIEF DESCRIPTION OF DRAWINGS

FIGS. 1.1, 1.2, 1.3, 1.4 and 1.5 show block diagrams of a system in accordance with one or more embodiments of the invention.

FIGS. 2.1 and 2.2 show flowcharts in accordance with one or more embodiments of the invention.

FIGS. 3.1, 3.2, 3.3, 3.4, and 3.5 show an example in accordance with one or more embodiments of the invention.

DETAILED DESCRIPTION

Figure 4:
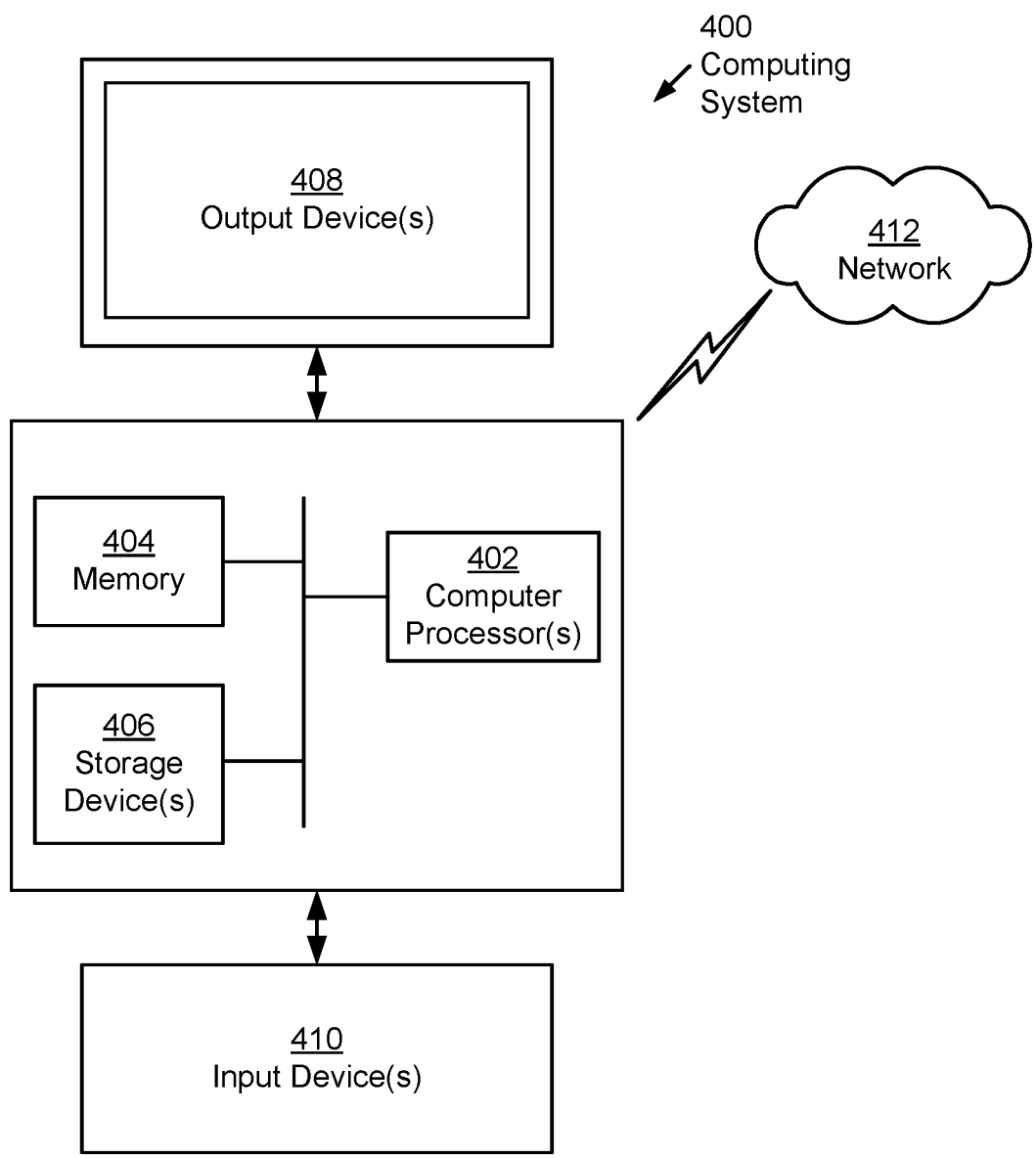
FIG. 4 shows a computing system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system, a method, and a computer readable medium for operating a network with hierarchical statistics acceleration. Hierarchical statistics acceleration refers to accelerating the computation of the hierarchical statistics by separating the computing resource that computes the hierarchical statistics from the computing resource that processes other aspects of network traffic (i.e., the sample for computing hierarchical statistics). In this context, hierarchical statistics acceleration is also referred to as hierarchical statistics offload. One or more embodiments offload the management of statistics from the operations of the data path processor in such a way to minimize the amount of processing by the data path processor. Thus, the data path processor may expend computational resources on processing actual frames.

In one or more embodiments of the invention, a channel identifier is received, in connection with a statistic of an input frame, by a statistics engine of a network device, where the channel identifier identifies a channel of a virtual network structure. In particular, the input frame is received by the network device via the channel of the virtual network structure. In response to receiving the channel identifier in connection with the statistic, a hierarchical data structure is traversed by a statistics engine based on the channel identifier, where the hierarchical data structure includes hierarchical statistic attributes of the virtual network structure. Based on the traversing and from the hierarchical statistic attributes, linked statistic attributes that are linked to the channel identifier in the hierarchical data structure are selected by the statistics engine. Accordingly, an existing value of each linked statistic attribute is incremented by the statistics engine based on the statistic to generate an incremented value. Subsequent to the incrementing the existing value, the hierarchical statistic attributes are presented. Accordingly, an operation of the network is performed in response to presenting the hierarchical statistic attributes.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes multiple client devices (e.g., client device X (102-1), client device Y (102-2), client device Z (102-3), etc.) connected by a network (150) in accordance with one or more embodiments. In general, the network (150) provides network services to the client devices (e.g., client device X (102-1), client device Y (102-2), client device Z (102-3), etc.). In particular, the network services are provided by one or more service providers operating the network (150) to one or more users of the client devices. For example, one or more client devices (e.g., client device X (102-1), client device Y (102-2), client device Z (102-3), etc.) may be configured to send data over the network (150). Similarly, one or more client devices (e.g., client device X (102-1), client device Y (102-2), client device Z (102-3), etc.) may be configured to receive data over the network (150). In one or more embodiments, the network services allow the client devices (e.g., client device X (102-1), client device Y (102-2), client device Z (102-3), etc.) to send/receive data in one or more signal types including Ethernet, digital video, Synchronous Optical Networking (SONET)/Synchronous Digital Hierarchy (SDH), G.709 Optical Transport Network (OTN), and other formats/protocols that are native to the client devices. The client devices (e.g., client device X (102-1), client device Y (102-2), client device Z (102-3), etc.) may be computing devices of any type including mobile phones, desktop or tablet personal computers (PCs) used by the users, routers, switches or servers operated by the users for accessing the network (150), or other devices operated by the users. Examples of the client devices (e.g., client device X (102-1), client device Y (102-2), client device Z (102-3), etc.) may correspond to various portions of the computing system described in reference to FIG. 4 below.

In one or more embodiments of the invention, the network (150) includes wired and/or wireless portions of a telecommunications network. In one or more embodiments, a telecommunications network includes a collection of devices, links, and any intermediate elements (e.g., software and/or hardware network components) that are connected to enable telecommunication between the devices of the telecommunications network. As shown in FIG. 1.1, the device X (106-1), device Y (106-2), device Z (106-3), etc., are devices of the telecommunication network and may be computing devices or networking devices of any type, including servers, routers, switches, etc., operated by one or more service providers of the network (150). Each device (e.g., device X (106-1), device Y (106-2), device Z (106-3)) may have one or more ports, which are physical and/or logical interfaces for communicating with other devices. Examples of the devices (e.g., device X (106-1), device Y (106-2), device Z (106-3)) of the network (150) may correspond to various portions of the computing system described in reference to FIG. 4 below.

Within the network (150), a network path (e.g., network path XY (151), network path XZ (152)) between two devices is a sequence of one or more links, one or more intermediate elements, and/or any intervening devices that connect the two devices. A link may be a connection between two ports residing on two separate devices (i.e., external link) or within a single device (i.e., internal link).

In one or more embodiments, a device may be connected to multiple network paths. For example, the device X (106-1) is connected to the network path XY (151) and the network path XZ (152). In one or more embodiments, multiple network paths may exist between two devices. Accordingly, messages or other telecommunication data may be exchanged between the two devices via one or more of the network paths. In one or more embodiments, the network path XY (151) is used to provide the network services to the client device X (102-1), client device Y (102-2), and client device Z (102-3) where the device X (106-1) and device Y (106-2) act as the interfaces (i.e., edge network devices) to the network (150). In one or more embodiments, the network (150) includes multiple layers according to a layered network architecture, such as the seven-layer OSI model of computer networking. In such embodiments, the network paths (e.g., network path XY (151)) may include links, intermediate elements, and/or any intervening devices that support or otherwise are associated with one or more network layers.

As further shown in FIG. 1.1, the network (150) includes a network provisioning server (101) in accordance with one or more embodiments. The network provisioning server (101) has many functions including network service provisioning. Network service provisioning involves the process of identifying and allocating resources in the network (150) to provide the network services to the client devices (e.g., client device X (102-1), client device Y (102-2), client device Z (102-3), etc.). In particular, identifying the resources includes device discovery, routing, and path computation in the network (150). In one or more embodiments, the network provisioning server (101) is configured to create, modify, terminate (i.e., tear down), and restore (i.e., reestablish) connections between the client devices based on network paths in the network (150). For example, the network path XY (151) may be computed or otherwise generated by the network provisioning server (101) to provide a connection through the network (150) for the client device X (102-1) and client device Z (102-3). In addition, bandwidth and other resources of the links, intermediate elements, and/or any intervening devices in the network path XY (151) are allocated by the network provisioning server (101) to the connection according to a service agreement between one or more service providers of the network (150) and the users of the client device X (102-1) and client device Z (102-3). In one or more embodiments, the network provisioning server (101) is a dedicated device separate from the devices (e.g., device X (106-1), device Y (106-2), device Z (106-3)) that provide telecommunication between the client devices. In one or more embodiments, at least a portion of the network provisioning server (101) may be distributed and reside within the devices (e.g., device X (106-1), device Y (106-2), device Z (106-3)) that provide telecommunication between the client devices.

Although FIG. 1.1 only shows three client devices (e.g., client device X (102-1), client device Y (102-2), client device Z (102-3)), three network devices (e.g., device X (106-1), device Y (106-2), device Z (106-3)), and two network paths (e.g., network path XY (151), network path XZ (152)), those skilled in the art, having the benefit of this detailed description, will appreciate that the system (100) may have any number of client devices, network devices, and network paths. Further, different network paths may share one or more devices or have different devices altogether.

In one or more embodiments, a portion of the network (150) may be provisioned as a virtual network structure described in detail below. Based on the virtualization technology, network devices, links, and other resources of the network (150) may be logically divided into virtualized building blocks. In one or more embodiments, the virtual network structure is a structure of virtualized building blocks that connect, or chain together, to create communication services. For example, the network path XY (151) may be part of a virtual network structure, such as a tunnel or a virtual private network (VPN). In another example, a portion of the bandwidth of the network path XY (151) may be provisioned as a virtual network structure (160) described in reference to FIG. 1.2 below.

In one or more embodiments, a portion of the virtualized building blocks in the virtual network structure (160) are chained to form a logical connection medium referred to as a channel of the virtual network structure (160). In one or more embodiments, the virtual network structure (160) and channels are hierarchical. FIG. 1.2 shows the virtual network structure (160) that is organized as a first hierarchy (160-1) having a first hierarchy channel A (161), a first hierarchy channel B (162), etc. Further, the first hierarchy channel B (162) includes a second hierarchy channel A (162-1), a second hierarchy channel B (162-2), etc. In this context, each of the first hierarchy channel A (161) and first hierarchy channel B (162) is considered as a channel "within" a channel. Similarly, each of the second hierarchy channel A (162-1) and second hierarchy channel B (162-2) is considered as a channel "within" a channel "within" a channel. In one or more embodiments, the channels of the virtual network structure (160) are tunnels or part of a VPN.

Although FIG. 1.2 only shows two levels of hierarchies and four hierarchy channels, those skilled in the art, having the benefit of this detailed description, will appreciate that the virtual network structure (160) may have any number of hierarchical levels and/or hierarchy channels. Further, the virtual network structure (160) may include other types of virtualized building blocks. An example of the virtual network structure (160) is described in reference to FIG. 3.1 below.

Generally, telecommunication data may be transmitted in the network (150) in individual data packet collections that are referred to as frames, such as the frame (130) depicted in FIG. 1.3. For telecommunication data transmitted over the virtual network structure (160), the number of frames, data byte counts, and other types of statistics are computed to perform user billing, bandwidth management, and other network management tasks. As shown in FIG. 1.3, the frame (130) includes the metadata (131) and payload (132) that are transmitted via a channel of the virtual network structure (160). The payload (132) includes data packets of the telecommunication data. The metadata (131) includes a channel identifier (123-1) to identify the channel. For example, the channel identifier (123-1) identifies that the frame (130) is transmitted via the second hierarchy channel A (162-1). In addition, the metadata (131) includes a statistic attribute (123-2) that specifies the one or more types of statistics that are to be computed for the frame (130).

As used herein, the statistic is a data item that represents a numerical fact or approximation about network traffic or a component of network traffic. For example, the statistic attribute (123-2) may specify that one or more of a frame statistic, a data chunk (e.g., bit, byte, word, nibble, etc.) statistic, or various supplemental statistics are to be computed for the frame (130). For the frame (130), the frame statistic represents one frame received and the data chunk statistic represents the number of data chunks (e.g., bit, byte, word, nibble, etc.) in the frame (130). The frame statistic of a frame corresponds to, or otherwise represents a default value of one. For example, the supplemental statistic may represent a characteristic of a frame received, (CFM, DMM, IP, etc.), a system assigned characteristic (such as color, logical channel identifier or virtual switch membership, etc.), the number of data chunks removed from the frame (130) up to the total frame length, thus, representing a value of decapsulation, byte removal or dropped frame.

Additional examples of supplementary statistics include:
(i) Statistics describing frames dropped relative to their priority color, which include frames dropped while marked green, frames dropped while marked yellow, frames dropped while marked red.
(ii) Statistics describing frames allowed relative to the Frame's priority color which include, frames allowed green, frames allowed yellow and frames allowed red.
(iii) Supplementary drop reason statistics may include statistics describing frames dropped due to payload drop bit set (forced drop per the configuration of the system), frames dropped due to weighted random early detection (WRED), frames dropped due to system misconfiguration (e.g., a required lookup table was not configured properly and caused the frame to drop).
(iv) Statistics describing frames dropped due to lack of system resources.
(v) Supplementary protocol statistic may include counts of the number of frames and bytes identified as Y.1731 or other OAM related protocols, multiprotocol label switching (MPLS), MPLS-transport profile (MPLS-TP), provider backbone transport (PBT), Q-in-Q, single VLAN tagged, etc.

The above statistics may also be hierarchically maintained, such as frames dropped while green on second hierarchical channel A, or frames allowed while marked RED on hierarchical channel B, or MPLS frames allowed marked Yellow on primary hierarchy channel A. Those skilled in the art, having benefit of this disclosure will appreciate that any combination of frame characteristics or system level identifications may be used to create a specific type of statistic.

In one or more embodiments, the statistic attribute is channel specific. In other words, different frames transmitted via a channel specify the same types of statistics to be computed. In one or more embodiments, the statistic attribute is frame specific. In other words, the types of statistics to be computed for different frames transmitted via a channel may be different from each other. In one or more embodiments, the types of statistic to be computed for the frame (130) are specified using other schemes where the metadata (131) may not include any statistic attribute.

FIG. 1.4 shows a network device (110) in accordance with one or more embodiments. The modules and elements of FIGS. 1.1, 1.2, 1.3, 1.4, and 1.5 are collectively referenced in describing the network device (110) below. In particular, the network device (110) includes example details of a device (e.g., device X (106-1), device Y (106-2), device Z (106-3)) that provides telecommunication between the client devices (e.g., client device X (102-1), client device Y (102-2), client device Z (102-3), etc.) depicted in FIG. 1.1 above. In one or more embodiments, one or more of the modules and elements shown in FIG. 1.4 may be omitted, repeated, and/or substituted. Accordingly, embodiments of the invention should not be considered limited to the specific arrangements of modules shown in FIG. 1.4.

As shown in FIG. 1.4, the network device (110) includes one or more data path elements (e.g., data path processor A (111), data path processor B (112), data path processor C (113)) coupled to respective ports (e.g., port A (110-1), port B (110-2), port C (110-3)), a statistics engine (114), and a repository (120) that are coupled to each other via a communication link (115). Each of these components may include a software component, a hardware component, or a combination thereof.

In one or more embodiments of the invention, the repository (120) includes a disk drive storage device, a semiconductor storage device, a database management system, other suitable computer data storage devices, or combinations thereof. In one or more embodiments, content stored in the repository (120) may be a data file, a linked list, a data sequence, a database, a graphical representation, or any other suitable data structure. In one or more embodiments of the invention, the repository (120) includes functionality to store data for the network device (110), such as the data generated and/or used by the data path processor A (111), data path processor B (112), data path processor C (113) and/or statistics engine (114).

In one or more embodiments of the invention, the content stored in the repository (120) includes a hierarchical data structure (120-1) and accumulated hierarchical statistics (120-2). The hierarchical data structure (120-1) is a hierarchy of parent-child relationships used by the statistics engine (114) to compute hierarchical statistics in response to an instruction from the data path processor A (111). In one or more embodiments, the hierarchical data structure (120-1) includes a tree hierarchy, a linked list, or other types of data structure with a hierarchy. The accumulated hierarchical statistics (120-2) are the hierarchical statistics computed by the statistics engine (114) over a sample of frames received and processed by the data path processor A (111). In one or more embodiments, the sample of frames includes multiple input frames that are received via the port A (110-1) within a pre-determined time duration, such as a second, minute, hour, day, week, month, etc. Alternatively, the sample of frames includes multiple input frames that are included in the sample according to other types of pre-determined sampling criterion. In one or more embodiments, the pre-determined time duration and/or pre-determined sampling criterion are specified according to a client billing requirement, a bandwidth management requirement, or other types of network management requirement. Accordingly, the accumulated hierarchical statistics (120-2) are computed as a basis for performing a client billing operation, a bandwidth management operation, or other types of network management operation.

In one or more embodiments of the invention, the data path processor A (111) is configured to extract the channel identifier and the statistic attribute from each input frame received via the port A (110-1). For example, the data path processor A (111) extracts the channel identifier (123-1) and the statistic attribute (123-2) from the frame (130) that is received via the second hierarchy channel A (162-1). The data path processor A (111) is further configured to generate, according to the statistic attribute (132-2), a frame statistic, a data chunk statistic, and/or a supplemental statistic of the frame (130) for transmitting to the statistics engine (114). In one or more embodiments, the data path processor A (111) transmits the statistics in connection with the channel identifier (123-1) on a frame by frame basis. In other words, each transmission includes the statistics for a single input frame. As additional input frames are received via the second hierarchy channel A (162-1), the statistics engine (114) is configured to generate one or more accumulated statistics of the second hierarchy channel A (162-1) by accumulating the statistics received from the data path processor A (111).

Similarly, as other input frames are received via the second hierarchy channel B (162-2) and processed by the data path processor A (111), statistics are generated according to the extracted statistic attribute K (142) (depicted in FIG. 1.5 below) and transmitted to the statistics engine (114). The statistics engine (114) accumulates the statistics received from the data path processor A (111) to generate one or more accumulated statistics of the second hierarchy channel B (162-2). In one or more embodiments, the accumulated hierarchical statistics (120-2) include the accumulated statistics of the second hierarchy channel A (162-1) and the second hierarchy channel B (162-2). Additional portions of the accumulated hierarchical statistics (120-2) are derived from the accumulated statistics of the second hierarchy channel A (162-1) and the second hierarchy channel B (162-2) by the statistics engine (114) traversing the hierarchical data structure (120-1).

In one or more embodiments, the hierarchy of parent-child relationships in the hierarchical data structure (120-1) is defined according to the hierarchy of the virtual network structure (160). In other words, the parent-child relationships in the hierarchical data structure (120-1) correspond to the parent-child relationships in the virtual network structure (160). As used herein, the parent-child relationships are also referred to as hierarchy attributes. FIG. 1.5 shows an example of the hierarchical data structure (120-1) that includes leaf nodes (i.e., node J (141a), node K (142a), node L (142b)) and non-leaf nodes (i.e., node M (141b), node I (140)) where each arrow points from a child node to a parent node. A leaf node is a node that does not have any child node. A non-leaf node is a parent node to at least one child node. In particular, the node M (141b) is a parent node of the node K (142a) and node L (142b). Similarly, the node I (140) is a parent node of the node J (141a) and node M (141b). Corresponding to FIG. 1.2, the node K (142a), node L (142b), node J (141a), node M (141b), node J (141a), and node I (140) represent the second hierarchy channel A (162-1), second hierarchy channel B (162-2), first hierarchy channel B (162), first hierarchy channel A (161), and the first hierarchy (160-1), respectively, of the virtual network structure (160). In one or more embodiments, each node references a location in the repository (120) for storing the accumulated statistics of the corresponding channel. The hierarchical data structure (120-1) is any data structure that maintains a hierarchy having a parent child relationship between nodes. Examples of a hierarchy include logical trees, logical forests, and partially ordered sets (e.g., POSETs). For example, a logical tree has a specific numbers of nodes, leaf nodes, non-leaf nodes, parent nodes, and child nodes, whereby each child node has a parent node. In a POSET, each child node has one or more parent nodes and each parent node has one or more child nodes, such that a cycle does not exist. The hierarchical data structure (120-1) may have any number of nodes, leaf nodes, non-leaf nodes, parent nodes, and child nodes. In addition, the hierarchical data structure (120-1) may also be organized in different format from FIG. 1.2, such as a linked list, a graph, etc.

In one or more embodiments, the statistics for the leaf nodes are generated by the data path processor A (111) and accumulated by the statistics engine (114). The statistics for the non-leaf nodes are derived and accumulated by the statistics engine (114) from the statistics for the leaf nodes. In one or more embodiments, in response to a statistic received from the data path processor A (111) for a leaf node, as identified by the channel identifier, the statistics engine is configured to traverse the parent-child relationships to accumulate the statistic for each parent of the leaf node. While the types of statistics generated for each leaf node are according to the corresponding statistic attribute, the types of statistics accumulated for a non-leaf node are a combination of the statistic attributes of child nodes of the non-leaf node. For example, the types of statistics accumulated for node M (141*b*) are represented by the statistic attribute M (144), which is a combination of the statistic attribute (123-2) and the statistic attribute K (142). Similarly, the types of statistics accumulated for node I (140) are a combination of the statistic attribute M (144) and another statistic attribute (not shown) for the node L (142*b*). When each statistic for the node J (141*a*) or node K (142*a*) is received by the statistics engine (114), the statistics engine (114) increments the corresponding statistics for the node M (141*b*) and node I (140) based on the parent-child relationships. In this context, the collection of statistic attributes of the hierarchical data structure (120-1) is referred to as hierarchical statistic attributes of the virtual network structure (160). In one or more embodiments, the nodes are assigned corresponding channel specific statistic attributes. In the scenario where the statistic attributes are frame specific, the statistic attribute assigned to the nodes may be updated by the statistics engine (114) according to the most recent input frame. In other words, the hierarchical statistic attributes of the virtual network structure (160) may be dynamically updated as input frames are received and processed.

Returning to the discussion of FIG. 1.4, in one or more embodiments of the invention, the data path processor A (111) includes an integrated network interface (115) and one or more computing cores (e.g., core 0 (111-1), . . . , core N−1 (111-N)) where N denotes the number of computing cores. In one or more embodiments, the data path processor A (111) is a single integrated circuit, such as an X86 processor based integrated circuit. In other words, the computing cores (e.g., core 0 (111-1), . . . , core N−1 (111-N)) are x86 compatible computing circuits. In one or more embodiments, the network device (110) includes different types of data path processors. For example, the data path processor B (112) may be a stand-alone network interface card with limited computing capability. In another example, the data path processor C (113) may be hardwired, such as implemented using field a programmable gate array (FPGA) instead of x86 compatible processors.

As described above, the data path processor A (111), data path processor B (112), and data path processor C (113) are configured to process input frames received via associated ports. In particular, processing input frames includes determining routing destinations and performing other network management tasks. In one or more embodiments, the data path processor A (111) is configured to execute a single write instruction to transmit the channel identifier and one or more statistics to the statistics engine (114). As noted above, the statistic attribute may be channel specific and different from each other. For example, receiving the frame (130) via the second hierarchy channel A (162-1) may initiate one single write instruction that includes the channel identifier (123-1) and only the frame statistic of the frame (130). In other words, the statistic attribute (123-2) specifies that only the frame statistic is to be computed. In another example, receiving another input frame via the second hierarchy channel B (162-2) may initiate another single write instruction that includes the channel identifier identifying the first hierarchical element B (162) and the frame statistic, data byte statistic, and supplemental statistic of the input frame. In other words, the statistic attribute K (142) specifies that the frame statistic, data byte statistic, and supplemental statistic are to be computed.

In one or more embodiments of the invention, the communication link (115) includes address signals and data signals for exchanging information among the data path processor A (111), data path processor B (112), data path processor C (113), the statistics engine (114), and the repository (120). In particular, the communication link (115) includes electrical and/or optical communication hardware (e.g., signal traces, transceivers, etc.) for transmitting the address signals and data signals. In one or more embodiments, executing the aforementioned single write instruction initiates a single write cycle of the communication link (115). Specifically, the single write cycle includes a write address (based on the channel identifier) and a write data (based on the statistics of the input frame) that are driven onto the communication link (115) by the data path processor A (111), data path processor B (112), or data path processor C (113). An example of the single write instruction and single write cycle is described in reference to FIGS. 3.5 and 3.6 below.

In one or more embodiments of the invention, the statistics engine (114) includes an input receiver (114-1), a statistics attributes analyzer (114-2), and an incrementor (114-3). In one or more embodiments, the statistics engine (114) is implemented as a single integrated circuit, such as a field programmable gate array (FPGA). In one or more embodiments, the statistics engine (114) is integrated within the data path processor A (111). For example, the statistics engine (114) may be implemented as a dedicated computing core (e.g., core N−1 (111-N)) or an embedded FPGA circuitry, while other computing cores (e.g., core 0 (111-1)) perform data path processing tasks of the data path processor A (111). In one or more embodiments, the input receiver (114-1) is configured to receive information (i.e., channel identifier in connection with the statistics) contained in the aforementioned single write cycle. In one or more embodiments, the write address is based on the channel identifier to address a data port of the input receiver (114-1) while the write data is based on the statistics to be written into the data port. For example, the data port may be a data register embedded in the input receiver (114-1). In another example, the data port may be memory-mapped in the repository (120). In one or more embodiments, the input receiver (114-1) is configured to receive the information (i.e., channel identifier in connection with the statistics) contained in the aforementioned single write cycle using other applicable schemes.

In one or more embodiments, in response to the single write cycle, the statistics attributes analyzer (114-2) is configured to traverse the hierarchical data structure (120-1) for accumulating statistics of non-leaf nodes. In one or more embodiments, the incrementor (114-3) is configured to increment existing values of the accumulated statistics of the leaf nodes and the traversed non-leaf nodes. In one or more embodiments, the input receiver (114-1), the statistics attributes analyzer (114-2), and the incrementor (114-3) cooperatively perform the functions of the statistics engine (114) using the method described in reference to FIGS. 2.1 and 2.2 below.

In the hierarchical data structure (120-1) described above, the parent-child relationships correspond to hierarchy attributes of the virtual network structure (160). In one or more embodiments, one or more additional parent-child relationships of the hierarchical data structure (120-1) may be based on user attributes of a user of the virtual network structure (160). An example of the hierarchical data structure (120-1) according to a parent-child relationship based on the user attributes is described in reference to FIG. 3.2 below.

Although traversal of the parent-child relationships is described above to start from a leaf node corresponding to the channel identifier specified in the single write instruction, in one or more embodiments, the single write instruction may also specify a channel identifier that corresponds to a non-leaf node to start the parent-child traversal.

FIG. 2.1 shows a flowchart in accordance with one or more embodiments. The process depicted in FIG. 2.1 may be used to offload statistics computations from a data path processor to a statistics engine. The process shown in FIG. 2.1 may be executed, for example, by one or more components discussed above in reference to FIGS. 1.1-1.5. One or more steps shown in FIG. 2.1 may be omitted, repeated, and/or performed in a different order among different embodiments of the invention. Accordingly, embodiments of the invention should not be considered limited to the specific number and arrangement of steps shown in FIG. 2.1.

Initially, in Step 201, an input frame is received by a data path processor of the network device. In one or more embodiments, the input frame is received via a port of the network device. Specifically, the input frame is received via a channel of a virtual network structure coupled to the port.

In Step 202, the channel identifier identifying the channel is extracted by the data path processor from the input frame. In one or more embodiments, the channel identifier and an optional statistic attribute are extracted from metadata of the input frame.

In Step 203, one or more statistics of the input frame is generated by the data path processor. In one or more embodiments, the data path processor generates one or more of a frame statistic, a data chunk statistic, and a supplemental statistic accordingly to the statistic attribute of the channel. For example, the statistic attribute extracted from the input frame may be used to define what types of statistics are to be generated. In another example, the statistic attribute may be obtained in a different manner to define what types of statistics are to be generated.

In Step 204, the channel identifier in connection with the statistic are transmitted by the data path processor to the statistics engine. In one or more embodiments, the channel identifier and the statistic are transmitted by the data path processor executing a single write instruction that includes the channel identifier and the statistic. In one or more embodiments, the single write instruction initiates a single write cycle of a communication link between the data path processor and the statistics engine. In other words, the channel identifier and the frame statistic, data chunk statistic and/or supplemental statistic are inserted by the data path processor in the single write cycle. To perform the single write cycle, the channel identifier may be used to generate address signals of the communication link while the one or more statistics are used to generate data signals of the communication link. Accordingly, the channel identifier in connection with the statistic are received by the statistics engine from the single write cycle.

Using the single write instruction, the offloading of varying complexities of hierarchical statistics computations consumes a consistent instruction cycle utilization of the data path processor. Using the single write cycle, the offloading of varying complexities of hierarchical statistics computations consumes a consistent bus cycle utilization of the communication link.

FIG. 2.2 shows a flowchart in accordance with one or more embodiments. The process depicted in FIG. 2.2 may be used to offload statistics computations from a data path processor to a statistics engine. The process shown in FIG. 2.2 may be executed, for example, by one or more components discussed above in reference to FIGS. 1.1-1.5. One or more steps shown in FIG. 2.2 may be omitted, repeated, and/or performed in a different order among different embodiments of the invention. Accordingly, embodiments of the invention should not be considered limited to the specific number and arrangement of steps shown in FIG. 2.2.

Initially in Step 214, the channel identifier in connection with the statistic are received the statistics engine. In one or more embodiments, the channel identifier and the statistic are transmitted by the data path processor executing a single write instruction that includes the channel identifier and the statistic. In one or more embodiments, the single write instruction initiates a single write cycle of a communication link between the data path processor and the statistics engine. Accordingly, the channel identifier in connection with the statistic are received by the statistics engine from the single write cycle.

In Step 215, in response to the receiving the channel identifier in connection with the statistic, a hierarchical data structure is traversed by the statistics engine. In one or more embodiments, the statistics engine uses the channel identifier to identify an entry point to start traversing parent-child relationships in the hierarchical data structure. In one or more embodiments, the entry point is a leaf node of the hierarchical data structure, as specified by the channel identifier. In one or more embodiments, the entry point may also be a non-leaf node of the hierarchical data structure, as specified by the channel identifier.

In Step 216, based on the traversing, a number of linked statistic attributes are selected by the statistics engine from the hierarchical statistic attributes of hierarchical data structure. In particular, the linked statistic attributes are linked to the channel identifier in the hierarchical data structure according to the parent-child relationships. In one or more embodiments, the linked statistic attributes correspond to parent nodes that are one or more hops from the entry points where the traversal starts.

In Step 217, an existing value of each linked statistic attributes is incremented by the statistics engine to generate an incremented value. In particular, the increment is based on the statistic received from the data path processor. If the frame statistic is included in a linked statistic attribute, the existing value is incremented by one each time the corresponding node is traversed. If the data chunk statistic or supplemental statistic is included in a linked statistic attribute, the existing value is incremented, each time the corresponding node is traversed, by the value of the corresponding statistic received from the data path processor.

In Step 218, subsequent to traversing the hierarchical data structure and incrementing existing values, the accumulated hierarchical statistics are presented. In one or more embodiments, the accumulated hierarchical statistics are presented in response to the statistics engine acting on the single write cycle. In other words, the accumulated hierarchical statistics are presented while being accumulated over a sample of input frames. In one or more embodiments, the accumulated hierarchical statistics are presented by automatically displaying to the network service provider. In one or more embodiments, the accumulated hierarchical statistics are presented in response to a request from the network service provider. In one or more embodiments, the presentation may be to display the accumulated hierarchical statistics or to transmit the accumulated hierarchical statistics to a component that uses the accumulated hierarchical statistics to perform network management. Further, in some embodiments, the entire accumulated hierarchical statistics are presented, while in other embodiments, only a portion of the accumulated hierarchical statistics is presented. In one or more embodiments, an operation of the network, such as a user billing operation, a bandwidth allocation operation, or other network management operation, is performed in response to the presenting the hierarchical statistic attributes.

FIGS. 3.1, 3.2, 3.3, 3.4, and 3.5 show an example in accordance with one or more embodiments of the invention. The modules and elements of FIGS. 3.1, 3.2, 3.3, 3.4, and 3.5 are collectively referenced below in describing the example. In one or more embodiments, one or more of the modules and elements shown in FIGS. 3.1-3.5 may be omitted, repeated, and/or substituted. Accordingly, embodiments of the invention should not be considered limited to the specific arrangements of modules shown in FIGS. 3.1-3.5.

In a current network environment where hierarchical statistics computation is not offloaded to a statistics engine, the data path processor executes instructions for a read modify write action in addition to carrying out lookups relative to the statistics address associated with a specific frame. In a network function virtualization (NFV) environment, large amounts of statistics are desired in hierarchical arrangement. Performing the hierarchical statistics computation on a frame by frame basis increases processor utilization as more and more types of statistics are computed. Each time a frame is received, the data path processor performs the following tasks for each of the hierarchical statistic attributes described above.

1. Lookup of hierarchical membership (i.e., channel identifier) for a frame.
2. Reading the current byte count of accumulated byte count statistic.
3. Reading the current frame count of the accumulated frame statistic.
4. Add one to the current frame count.
5. Add frame length to the current byte count.
6. Write the new byte count (i.e., incremented byte count statistic) back to memory.
7. Write the new frame count (i.e., incremented frame statistic) back to memory.

Using the network device and method described in reference to FIGS. 1.2-1.5 above, the entire process describe above is reduced to a single read from frame metadata (e.g., a classification payload table) and a single write to the statistics engine using the retrieved information from the payload table combined with the frame length. For example, for a 4 level hierarchical statistic attributes scenario, 28 (7*4) statistics related tasks are reduced to 1 single instruction per frame. Furthermore, the processing cost of adding additional levels of the hierarchical statistic attributes are contained within the statistics engine without invoking proportional amounts of instructions from the data path processor. Complex hierarchies may be modeled within the statistics engine allowing for orthogonal frame accountings (i.e., multiple versions of hierarchical statistic attributes) to occur with no additional impact to the data path processor. Additional frame information such as drop and drop reason may also be encoded and inserted as supplemental statistic within the write data content to the statistics engine. Accordingly, the statistics breadth and detail (i.e., complexity of statistic attribute) are decoupled from the data path processor.

FIG. 3.1 shows an example tunnel structure (310), which corresponds to the virtual network structure (160) depicted in FIG. 1.2 above. Specifically, the first hierarchy (160-1), first hierarchy channel A (161), first hierarchy channel B (162), second hierarchy channel A (162-1), and second hierarchy channel B (162-2) correspond to the port A (310-20), tunnel FOO (310-17), tunnel FUM (310-13), tunnel FEE0 (310-10), and tunnel FEE1 (310-15), respectively. The channel identifier of each tunnel is denoted as N in the tunnel structure (310). For example, the channel identifier for the tunnel FEE0 (310-10) is 10, the channel identifier for the tunnel FEE1 (310-15) is 15, etc. In addition, three input frames are received via the tunnel FOO (310-17), tunnel FEE0 (310-10), and tunnel FEE1 (310-15), that are denoted as arrows. Each input frame is associated with a user attribute, such as the user attribute A (315-1), user attribute B (315-2), and user attribute C (315-3). In the example shown in FIG. 3.1, the customer attributes are tunnel specific. For example, the tunnel FOO (310-17), tunnel FEE0 (310-10), and tunnel FEE1 (310-15) are allocated by the network service provider for customer A video traffic, customer B traffic, and customer A web traffic, respectively.

FIG. 3.2 shows examples of hierarchical data structures for the tunnel structure (310) described above. The hierarchical data structure A (320-1) is an example of the hierarchical data structure (120-1) shown in FIG. 1.4 above. In particular, the hierarchical data structure A (320-1) is defined according to the hierarchy attributes of the tunnel structure (310). Specifically, the node 20 (320-20), node 17 (320-17), node 13, (320-13), node 10 (320-10), and node 15 (320-15) correspond to the port A (310-20), tunnel FOO (310-17), tunnel FUM (310-13), tunnel FEE0 (310-10), and tunnel FEE1 (310-15), respectively. The hierarchical data structure B (320-2) is substantially the same as the hierarchical data structure A (320-1) with the exception of an additional node 19 (320-19). In particular, the node 19 (320-19) is define according to the user attributes of the node 15 (320-15) and node 17 (320-17). Specifically, the node 19 (320-19) corresponds to a combination of the user attribute A (315-1) and user attribute C (315-3) which represent the combination of customer A web traffic and customer A video traffic. For example, the accumulated hierarchical statistics for the hierarchical data structure A (320-1) may be computed to monitor traffic flow rates for channel bandwidth allocation or other management task of the tunnel structure (310). The additional accumulated statistics for the node 19 (320-19) may be computed to monitor total customer A traffic for billing purpose. In other words, the accumulated statistics for the node 19 (320-19) may be included in a billing record of the customer A.

FIG. 3.3 shows an example of traversing the hierarchical data structure A (320-1) depicted in FIG. 3.2 above. Specifically, FIG. 3.3 shows a linked list (330), which is a version of the hierarchical data structure A (320-1). For example, the hierarchy tree shown in FIG. 3.2 may be automatically converted to the linked list (330). As shown in FIG. 3.3, the linked list (330) includes entries shown as individual rows, such as the linked list entry A (332-10), linked list entry B (332-13), linked list entry C (332-20), etc. The entries are based on a sequence of PTR (i.e., pointer) values. The entries with PTR values 10, 13, 15, 17, and 20 correspond to the node 10 (320-10), node 13 (320-13), node 15 (320-15), node 17 (320-17), and node 20 (320-20), respectively, shown in FIG. 3.2. For example, the linked list entry A (332-10) corresponds to the node 10 (320-10) and includes a PTR "10," a NEXT_PTR (i.e., next pointer) "13," and a IS_LAST attribute "NOT LAST." In particular, the NEXT_PTR "13" references the linked list entry B (332-13) and the IS_LAST attribute "NOT LAST" indicates that the linked list entry A (332-10) is not the last entry in the linked list (330). The linked list entry B (332-13) and linked list entry C (332-20) have similar contents. The entries that do not correspond to any node contain "NULL" for NEXT_PTR and IS_LAST.

As an example, in response to a single write cycle A (351) (described in reference to FIG. 3.5 below) identifying an input frame received by the data path processor via the tunnel FEE0 (310-10), the channel identifier "10" and byte count statistic of the input frame (referred to as BYTE_COUNT A) are retrieved by the statistics engine and used to select the linked list entry A (332-10) as an entry point (331) for traversing the linked list (330). According to the PTR and NEXT_PTR contents in the linked list entries, the statistics engine traverses the linked list entry A (332-10), linked list entry B (332-13), and linked list entry C (332-20). The traversal is indicated by the two arrows annotated within the linked list (330) and corresponds to the hierarchical path of node 10 (320-10), node 13 (320-13), and node 20 (320-20), shown in FIG. 3.2 above. During the traversal, the accumulated hierarchical statistics (333) of the tunnel structure (310) are updated. As shown, the accumulated hierarchical statistics (333) include statistics for the tunnel FEE0 (310-10), tunnel FUM (310-13), and port A (310-20) that are stored in the location A (334-10), location B (334-13), and location C (334-20), respectively, in the repository (120) shown in FIG. 1.4 above. Other statistics of the tunnel structure (310) are omitted for clarity. In particular, the accumulated hierarchical statistics (333) is an example of the accumulated hierarchical statistics (120-2) shown in FIG. 1.4 above.

As shown in FIG. 3.3, four content snapshots of the location A (334-10), location B (334-13), and location C (334-20) are shown in the accumulated hierarchical statistics (333). Specifically, the snapshot A (333-1) includes existing values of the byte count statistic stored in the location A (334-10), location B (334-13), and location C (334-20) prior to the traversal. In response to the statistics engine traversing the linked list entry A (332-10), the existing value of the byte count statistic stored in the location A (334-10) is incremented by BYTE_COUNT A and shown in bold and italic form in the snapshot B (333-2). In response to the statistics engine traversing the linked list entry B (332-13), the existing value of the byte count statistic stored in the location B (334-13) is incremented by BYTE_COUNT A and also shown in bold and italic form in the snapshot C (333-3). In response to the statistics engine traversing the linked list entry C (332-20), the existing value of the byte count statistic stored in the location C (334-20) is incremented by BYTE_COUNT A and also shown in bold and italic form in the snapshot D (333-4).

Although the linked list (330) is shown with a particular number of entries with specific content in each entry, those skilled in the art with the benefit of this disclosure will appreciate that the linked list used for traversing the hierarchical data structure described above may include any number of entries. Further, the arrangement of the repository locations and contents stored therein may differ from the description above. For example, each location may store additional statistics such as the frame statistic and/or other supplemental statistics.

FIG. 3.4 shows examples of the single write instruction described above. Specifically, the example instructions are based on a channel identifier field (341), a byte count statistic field (342), and a supplemental statistic field (343). Using the single write instruction, the offloading of varying complexities of hierarchical statistics computations consumes a consistent instruction cycle utilization of the data path processor. For example, in response to an input frame A (not shown) received by the data path processor via the tunnel FEE0 (310-10), the data path processor initiates the instruction A (340-1). According to the statistic attribute retrieved from the input frame A, the instruction A (340-1) includes (i) the channel identifier field (341) containing the channel identifier "10" of the tunnel FEE0 (310-10) as retrieved from the input frame A, and (ii) the byte count statistic field (342) containing a number of bytes of the input frame A "BYTE_COUNT A" as retrieved or computed from the input frame A. The supplemental statistic field (343) is omitted or contains "NULL" according to the statistic attribute retrieved from the input frame A.

In another example, in response to an input frame B (not shown) received by the data path processor via the tunnel FEE1 (310-15), the data path processor initiates the instruction B (340-2). According to the statistic attribute retrieved from the input frame B, the instruction B (340-2) includes (i) the channel identifier field (341) containing the channel identifier "15" of the tunnel FEE1 (310-15) as retrieved from the input frame B, (ii) the byte count statistic field (342) containing a number of bytes of the input frame B "BYTE_COUNT B" as retrieved or computed from the input frame B, and (iii) the supplemental statistic field (343) containing a number of dropped bits "DROP_BIT_COUNT A" as computed from the input frame B.

In yet another example, in response to an input frame C (not shown) received by the data path processor via the tunnel FOO (310-17), the data path processor initiates the instruction C (340-3). According to the statistic attribute retrieved from the input frame C, the instruction C (340-3) includes (i) the channel identifier field (341) containing the channel identifier "17" of the tunnel FOO (310-17) as retrieved from the input frame C, (ii) the byte count statistic field (342) containing a number of bytes of the input frame C "BYTE_COUNT C" as retrieved or computed from the input frame C, and (iii) the supplemental statistic field (343) containing a number of dropped bits "DROP_BIT_COUNT B" and a number of colored frames "COLOR_COUNT" as computed from the input frame C.

FIG. 3.5 shows examples of the single write cycle described above. Specifically, the example write cycles are based on address signals (350-1), data signals (350-2), and a write enable signal (350-3). Using the single write cycle, the offloading of varying complexities of hierarchical statistics computations consumes a consistent bus cycle utilization of the communication link. For example, the single write cycle A (351), single write cycle B (352), and single write cycle C (353) are initiated by the data path processor executing the instruction A (340-1), instruction B (340-2), and instruction C (340-3), respectively. When performing the single write cycle A (351), the address signals (350-1) take on the value "Address A" to select a data port of the statistics engine, the data signals (350-2) take on the value "BYTE_COUNT A" to be written into the selected data port, and the write enable signal (350-3) indicates the period when the address signals (350-1) and data signals (350-2) are valid. The single write cycle B (352) and single write cycle C (353) are performed similarly. As noted above, the data port may be a data register embedded in the statistics engine circuitry or memory-mapped in the repository (120) accessible by the statistics engine (114). In one or more embodiments, the single write cycle is a read-modify-write cycle such that the data port specified by each single write cycle coincides with the repository (120) location that stores the statistic for the corresponding leaf node in the hierarchical data structure (120-1). Referring back to the discussion of accumulated hierarchical statistics (333) shown in FIG. 3.3 above, "Address A" may select the location A (334-10) where the read-modify-write cycle increments the existing value by "BYTE_COUNT A." Further, the location A (334-10), location B (334-13), and location C (334-20) may be consecutive locations in the repository (120) shown in FIG. 1.4 above. In an example memory map of the repository (120), "Address B" selects a memory-mapped data port immediately following the location C (334-20). Similarly, "Address C" selects a memory-mapped data port immediately following a memory section that stores the statistics for traversed nodes starting from node 15 (320-15) shown in FIG. 3.2 above. In other words, a memory queue is allocated in the repository (120) for each hierarchical path in the hierarchical data structure (120-1) to store the hierarchical statistics that are computed during each traversal. "Address A," "Address B," and "Address C" select the starting locations of the memory queues such that the statistics in the starting queue locations are written by the data path processor using the read-modify-write cycles. Accordingly, additional hierarchical statistics computed by the statistics engine are written into the remaining locations in the memory queues. As a result, the example memory map improves memory utilization efficiency of the repository (120).

Hierarchical statistics acceleration may be extended to other concepts, such as hierarchical metering where a remote source (corresponding to the data path processor) produces an initial hierarchical pointer that is used by a metering engine (corresponding to the statistics engine) to lookup and manage a related group of meters, determine the overall result, and take appropriate meter management to provide a result to the remote source. Accordingly, computation cycles spent on the hierarchical lookup or meter management are substantially reduced for the remote source.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a network, comprising:
receiving, by a statistics engine of a network device, a channel identifier in connection with a statistic of an input frame, wherein the channel identifier identifies a channel of a virtual network structure, wherein the input frame is received by the network device via the channel of the virtual network structure;
traversing, by a statistics engine and in response to the receiving the channel identifier in connection with the statistic, a hierarchical data structure based on the channel identifier, wherein the hierarchical data structure comprises a plurality of hierarchical statistic attributes of the virtual network structure;
selecting, by the statistics engine based on the traversing and from the plurality of hierarchical statistic attributes, a plurality of linked statistic attributes that are linked to the channel identifier in the hierarchical data structure;
incrementing, by the statistics engine based on the statistic, an existing value of each of the plurality of linked statistic attributes to generate an incremented value; and
presenting, subsequent to the incrementing the existing value, the plurality of hierarchical statistic attributes.

2. The method of claim 1, further comprising:
receiving, by a data path processor of the network device, the input frame associated with the statistic;
extracting, by the data path processor and from the input frame, the channel identifier identifying the channel;
generating, by the data path processor, the statistic of the input frame; and
transmitting, by the data path processor to the statistics engine, the channel identifier in connection with the statistic,
wherein the channel is one of a plurality of channels of the virtual network structure, and wherein the plurality of channels correspond to a plurality of entry points of the hierarchical data structure.

3. The method of claim 1, further comprising:
executing, by the data path processor, a single write instruction to transmit the channel identifier in connection with the statistic,
wherein the single write instruction comprises the channel identifier and the statistic of the input frame.

4. The method of claim 3, further comprising:
generating, by the data path processor, a supplemental statistic of the input frame;
inserting, prior to executing the single write instruction, the supplemental statistic into the single write instruction, wherein the supplemental statistic is transmitted to the statistics engine via the single write instruction; and
incrementing, by the statistics engine based on the supplemental statistic, an existing supplemental value of each of the plurality of linked statistic attributes.

5. The method of claim 4,
wherein the single write instruction initiates a single write cycle of a communication link between the data path processor and the statistics engine, and
wherein the single write cycle comprises
a write address based on the channel identifier; and
a write data based on the statistic and the supplemental statistic of the input frame.

6. The method of claim 1, wherein the plurality of hierarchical statistic attributes comprises at least one selected from a group consisting of a hierarchy attribute of the virtual network structure and a user attribute of a user of the virtual network structure.

7. The method of claim 1, further comprising:
generating, by the data path processor based at least on the input frame and a second input frame, one or more output frames.

8. A network device of a network, comprising:
a statistics engine configured to
receive a channel identifier in connection with a statistic of an input frame, wherein the channel identifier identifies a channel of a virtual network structure, wherein the input frame is received by the network device via the channel of the virtual network structure,
traverse, in response to the receiving the channel identifier in connection with the statistic, a hierarchical data structure based on the channel identifier, wherein the hierarchical data structure comprises a plurality of hierarchical statistic attributes of the virtual network structure,
select, based on the traversing and from the plurality of hierarchical statistic attributes, a plurality of linked statistic attributes that are linked to the channel identifier in the hierarchical data structure,
increment, based on the statistic, an existing value of each of the plurality of linked statistic attributes to generate an incremented value, and
present, subsequent to the incrementing the existing value, the plurality of hierarchical statistic attributes; and
a repository storing the hierarchical data structure.

9. The network device of claim 8, further comprising:
a first port configured to
receive, via the channel of the virtual network structure, a plurality of input frames comprising the input frame;
a data path processor coupled to the first port and configured to
extract, from the input frame, a channel identifier identifying the channel;
generate the statistic of the input frame; and
transmit, to the statistics engine, the channel identifier in connection with the statistic,
wherein the channel is one of a plurality of channels of the virtual network structure, and
wherein the plurality of channels correspond to a plurality of entry points of the hierarchical data structure.

10. The network device of claim 9, the data path processor further configured to
execute a single write instruction to transmit the channel identifier in connection with the statistic,
wherein the single write instruction comprises the channel identifier and the statistic of the input frame.

11. The network device of claim 10,
wherein the data path processor is further configured to
generate a supplemental statistic of the input frame; and
insert, prior to executing the single write instruction, the supplemental statistic into the single write instruction,
wherein the supplemental statistic is transmitted to the statistics engine via the single write instruction, and
wherein the statistics engine is further configured to
increment, based on the supplemental statistic, an existing supplemental value of each of the plurality of linked statistic attributes.

12. The network device of claim 11, further comprising:
a communication link coupling the data path processor, the statistics engine, and the repository, wherein the single write instruction initiates a single write cycle of the communication link, and
wherein the single write cycle comprises:
a write address based on the channel identifier; and
a write data based on the statistic and the supplemental statistic of the input frame.

13. The network device of claim 8, wherein the plurality of hierarchical statistic attributes comprises at least one selected from a group consisting of a hierarchy attribute of the virtual network structure and a user attribute of a user of the virtual network structure.

14. The network device of claim 9, further comprising:
a second port configured to transmit a plurality of output frames,
wherein the data path processor is further configured to generate, based on the plurality of input frames, the plurality of output frames.

15. A statistics engine circuitry for a network device, comprising:
an input receiver configured to
receive a channel identifier in connection with a statistic of an input frame, wherein the channel identifier identifies a channel of a virtual network structure, wherein the input frame is received by the network device via the channel of the virtual network structure;
a statistic attributes analyzer configured to
traverse, in response to the receiving the channel identifier in connection with the statistic, a hierarchical data structure based on the channel identifier, wherein the hierarchical data structure comprises a plurality of hierarchical statistic attributes of the virtual network structure, and
select, based on the traversing and from the plurality of hierarchical statistic attributes, a plurality of linked statistic attributes that are linked to the channel identifier in the hierarchical data structure; and
an incrementor configured to
increment, based on the statistic, an existing value of each of the plurality of linked statistic attributes to generate an incremented value, and
present, subsequent to the incrementing the existing value, the plurality of hierarchical statistic attributes.

16. The statistics engine circuitry of claim 15, wherein the network device comprises:
the statistics engine;
a repository storing the hierarchical data structure;
a first port configured to
receive, via the channel of the virtual network structure, a plurality of input frames comprising the input frame;
a data path processor coupled to the first port and configured to
extract, from the input frame, a channel identifier identifying the channel;
generate the statistic of the input frame; and
transmit, to the statistics engine, the channel identifier in connection with the statistic; and
a communication link coupling the data path processor, the statistics engine, and the repository,
wherein the channel is one of a plurality of channels of the virtual network structure, and
wherein the plurality of channels correspond to a plurality of entry points of the hierarchical data structure.

17. The statistics engine circuitry of claim 16, where the receiving the channel identifier in connection with the statistic of the input frame comprises:
processing a single write cycle of the communication link, the single write cycle comprising:
a write address based on the channel identifier; and
a write data based on the statistic of the input frame.

18. The statistics engine circuitry of claim 17,
wherein the single write cycle is initiated by the data path processor executing a single write instruction,
wherein the single write instruction comprises the channel identifier and the statistic of the input frame.

19. The statistics engine circuitry of claim 18,
wherein the input receiver is further configured to
receive, from the data path processor and in connection with the channel identifier,
a supplemental statistic of the input frame, and
wherein the incrementor is further configured to
increment, based on the supplemental statistic, an existing supplemental value of each of the plurality of linked statistic attributes.

20. The statistics engine circuitry of claim 19,
wherein the single instruction further comprises the supplemental statistic, and
wherein the write data of the single write cycle is further based on the supplemental statistic.

* * * * *